Patented Mar. 31, 1936

2,035,586

UNITED STATES PATENT OFFICE 2,035,586

BREAD-LEAVENING COMPOSITION

Michele Bonotto, Torino, Italy, assignor, by mesne assignments, to American Soya Products Corporation, Evansville, Ind., a corporation of Indiana No Drawing. Application October 14, 1930, Serial No. 488,702

9 Claims. (Cl. 99—10)

This invention relates to a bread-leavening composition and particularly to a composition for use in association with yeast in making leavened white bread.

Objects of this invention are to provide a composition which, when used in association with yeast in making a dough batch, will take the place of cow milk now conventionally employed and will cause the bread produced to have superior leavening qualities over bread produced with cow milk; which when utilized as a substitute for the cow milk will result in materially reducing the cost of the bread; which will increase the nitrogenous or protein elements and provide greater nutritive value in the loaf; which will produce an interior loaf body of a pleasing white color, which is not materially changed from conventional white bread and a crust which is also pleasing in color; which will insure the uniform texture of the interior of the baked loaf; which will increase the yield in loaves from a given batch of dough with a conventional quantity of yeast.

This invention is based on the discoveries, first, that the addition to a dough batch made in the conventional manner from any suitable wheat or rye flour of a relatively small quantity amounting to approximately five (5%) percent of a purified soya-bean flour, which is vegetable powder derived from the soya bean, will, when mixed with water and used in association with the normal quantity of yeast, cause a leavening of the bread in the dough batch and enable such bread to be produced at a lower manufacturing cost than has heretofore been possible but that such bread will have a slightly yellowish shade of color which is unobjectional and in some cases may be preferred; secondly, that the addition to a dough batch of a vegetable sodium proteinate, preferably having its protein derived from the purified vegetable protein of the soya bean and preferably mixed with mineral salts, such as sodium biphosphate, calcium lactate and calcium biphosphate will enable a smaller quantity of the composition, amounting to approximately three (3%) percent of the quantity of flour employed, to cause the bread in association with the normal quantity of yeast to have enhanced leavening qualities; which bread will have a whiter color than the bread made with soya flour; thirdly, that either vegetable sodium proteinate or soya bean flour when mixed with relatively small percentages of mineral salts, such as calcium lactate, calcium biphosphate and sodium biphosphate will cause the leavening properties of the bread to be still further enhanced and will add desirable properties in the baked bread; and fourthly, that all of the compositions of materials abovementioned are capable of being used in the form of a dry powder and are capable of being stored for long periods of time without deterioration and are also capable of being mixed by the addition of water with the conventional wheat or rye flour in association with yeast.

In the preferred form of my invention for use in white wheat bread, I utilize a stable dry powdered composition having a formula comprising ninety (90%) percent of vegetable sodium proteinate preferably made from a purified soyabean protein mixed with approximately 2.50 percent of calcium lactate, 3.25 percent of calcium biphosphate and 4.25 percent of sodium biphosphate.

The use in a dough batch of a powder containing vegetable sodium proteinate, mineral salts, such as calcium lactate, calcium biphosphate and sodium biphosphate will provide a cow-milk substitute which will have a superior bread-leavening effect on the yeast than the normal quantity of cow milk, will increase the yield in loaves and will provide in the bread nutritive protein and mineral salt elements in increased quantity and thus increase the food value of the bread.

The vegetable protein curd utilized in the making of the vegetable sodium proteinate of my composition may be obtained from any suitable source, but in the preferred form of my invention, the vegetable sodium proteinate is derived by mixing one hundred (100) parts of moist soya bean curd with two and one-half (2½) parts of sodium bicarbonate and kneading the mixture until the soya-bean protein is dissolved. Such vegetable sodium proteinate derived from a curd made from soya bean is less expensive than other sodium proteinates and is for this reason more desirable than other proteinates.

Soya bean curd made in the conventional way has a characteristic unpleasant taste and will transmit a dark color to the bread, and this form of soya-bean curd may, therefore, be used only in cases where this color and taste are not considered important. When, however, it is desired to utilize my bread-leavening composition for white wheat bread it is necessary, in order to prevent transmission to such white bread of the usual unpleasant taste and odor and also to prevent discoloration of the bread, to utilize a curd which has been so purified as to free it not only from the said characteristic unpleasant taste and odor of the conventional soya bean but also to provide a curd which has been so purified as to free the same from the chlorophyl elements which would otherwise cause discoloration of bread, and, therefore, in the preferred form of my invention, I utilize a curd made in accordance with the process described in my application, Serial No. 437,265, filed March 19, 1930, for Refined vegetable product and process of making same. In accordance with said process, soya beans in the whole or dried bean or in such pieces as will avoid rupturing the oil cells thereof, are subjected to a bath containing a water soluble bleaching agent preferably comprising sulphur dioxide and water ($SO_2$ plus $H_2O$) at such relatively low temperatures as will not substantially change or alter the natural proteins or oil or fat contents thereof. Such beans are preferably immersed in a very weak and unstable solution of said sulphur dioxide and water having a quantity of sulphur dioxide in excess of the amount necessary to bleach and purify the beans. The charge of beans is maintained in this solution for a period of time which I find to be about ten hours and until they are completely saturated therewith and swelled or expanded thereby. The sulphur dioxide is then preferably liberated from the beans in gaseous form and this is preferably accomplished without the use of a neutralizing agent which would leave in the beany substance a reaction product or residue. While the liberation of the sulphur dioxide may be accomplished by subjecting the expanded charge of beans to washing with pure water, if such washing is continued for a sufficiently long period of time, I preferably accomplish this purpose by applying a suitable quantity of heat to the charge of beans in order to facilitate and accelerate the liberation of sulphur dioxide. This heat is preferably applied in a plurality of operations and, in the preferred process, I subject the charge of beans for a period of twenty to thirty minutes to a temperature from 60° C. to 80° C., and thereafter subject said beans to a temperature of one hundred degrees (100° C.) for a period of from one to four minutes.

Another method of removing the sulphur dioxide is, after draining off the solution of sulphur dioxide, to circulate through the beans in any suitable manner pure water and thereafter to subject the beans to the action of the steam at 100° C., for a period of from one to four minutes.

By the use of said process, I produce a new refined leguminous soya bean product which will have a white color, because chlorophyl pigment has been bleached; which will have the pleasant and agreeable taste or flavor of the bleached and taste-purified beany substance free from the characteristic unpleasant raw bean taste or flavor and free from any foreign salts or other foreign substances introduced during the process as a reaction product of a neutralizing agent with the bleaching agent; which will have the proteins in the natural condition unaltered by the process of bleaching and taste-purifying and soluble in water; which will have the proteins and fatty substances in their natural combined form unaltered by the process of bleaching and taste-purifying.

The oil may now be removed in any well-known manner, as by pressing the soya bean product or by the use of a solvent, such as benzine, and a dry soya bean flour is produced which will have the bread-leavening properties hereinabove specified and may be used in this form in association with yeast and as a substitute for cow's milk to produce a bread of good quality and nutritive value but such bread will still have a slightly yellowish shade of color, as hereinabove stated. Such soya bean flour is preferably mixed with mineral salts comprising sodium biphosphate, calcium lactate and calcium biphosphate as hereinafter more particularly set forth.

In the preferred form of my invention, however, I make from soya bean flour a moist soya bean curd by any well-known process. By the use of the process of my former application hereinabove specified, I am enabled to obtain a soya bean flour from which a purified soya bean curd may be made. A curd so derived is not only capable of being mixed with and dissolved by sodium bicarbonate in the proportion of one hundred (100) parts of moist curd to two and one-half (2½) parts of sodium bicarbonate to form a vegetable sodium proteinate having the desired bread-leavening properties but will produce a vegetable sodium proteinate which will also be free from any unpleasant odor or taste which would be transmitted to the bread and which will not, in the baking operation, cause any discoloration of white bread. This vegetable sodium proteinate may be used in dough batches in association with yeast as a substitute for cow's milk to produce white bread of good quality and nutritive value.

In the preferred embodiment of my invention, however, the vegetable sodium proteinate hereinabove specified is dried, powdered and mixed with about ten (10%) percent of mineral salts comprising 4.25% of sodium biphosphate, 2.50% of calcium lactate and 3.25% of calcium biphosphate. I find that when a powder so composed is employed in bread-making with a suitable quantity of water, the bread-leavening properties of the yeast will be materially improved and in conventional dough batches, the addition of such composition, will cause the leavening properties to be increased to a greater extent and the yield in loaves obtained to be greater than when vegetable sodium proteinate is employed alone.

I may add that my composition may be produced at a much less cost than cow's milk, said cost being approximately one-half the cost of cow's milk.

I find that a desirable formula for a composition using soya bean flour as the basic element is soya flour 93.41%; calcium biphosphate 2.11%; sodium biphosphate 2.83%; and calcium lactate 1.65%. A quantity of this composition equal to 5% of the quantity of wheat or rye flour employed is added to and mixed into the dough batch, this composition being mixed with a suitable quantity of water and added to a dough batch having the normal or conventional quantity of yeast usually employing with cow's milk.

Having described my invention, I claim:—

1. The herein-described composition for use with yeast in making leavened bread comprising a vegetable sodium proteinate, rich in protein in its natural unaltered condition and capable of use as a substitute for cow milk.

2. The herein-described composition for use with yeast in making leavened bread comprising a mixture of a vegetable sodium proteinate, and sodium biphosphate, calcium lactate and calcium biphosphate, said mixture being rich in protein in its natural, unaltered condition and mineral salts and capable of use as a substitute for cow milk.

3. The herein-described composition for use with yeast in making leavened bread comprising a vegetable sodium proteinate in the form of a stable powder, said powdered vegetable sodium proteinate being rich in protein in its natural, unaltered condition and capable of use as a substitute for cow milk powder.

4. The herein-described composition for use with yeast in making leavened bread comprising ninety (90%) percent vegetable proteinate two and one-half (2½%) percent calcium lactate, three and one-quarter (3¼%) percent calcium biphosphate and four and one-quarter (4¼%) percent sodium biphosphate, said mixture of vegetable proteinate being rich in protein in its natural, unaltered condition and being capable of use as a substitute for cow milk.

5. The herein-described composition for use with yeast in making leavened bread comprising ninety (90%) percent vegetable sodium proteinate in the form of a stable powder, two and one-half (2½%) percent calcium lactate, three and one-quarter (3¼%) percent calcium biphosphate and four and one-quarter (4¼%) percent sodium biphosphate, said mixture of vegetable proteinate being rich in protein in its natural, unaltered condition and being capable of use as a substitute for cow milk.

6. The herein-described composition for use with yeast in making leavened bread comprising a vegetable sodium proteinate composed of soya-bean protein in its natural, unaltered condition and freed from the characteristic unpleasant flavor and color-producing bodies, combined with sodium bicarbonate, said composition being rich in said protein and capable of use as a substitute for cow milk.

7. The herein-described composition for use with yeast in making leavened bread comprising a mixture of sodium biphosphate, calcium lactate and calcium biphosphate with a vegetable sodium proteinate composed of soya bean protein in its natural, unaltered condition and which has the characteristic unpleasant-flavor and color-producing bodies oxidized, combined with sodium bicarbonate, said composition being rich in said protein and capable of use as a substitute for cow milk.

8. The herein-described composition for use with yeast in making leavened bread comprising a vegetable sodium proteinate composed of substantially one hundred (100) parts of soya bean protein in its natural unaltered condition and which has the characteristic unpleasant-flavor and color-producing bodies oxidized, and combined with two and one-half (2½) parts of sodium bicarbonate, said composition being rich in said protein and capable of use as a substitute for cow milk.

9. The herein-described composition for use with yeast in making leavened bread comprising a stable powder composed of a mixture in powdered form of sodium biphosphate, calcium lactate and calcium biphosphate, with a vegetable sodium proteinate also in powdered form and composed of purified soya bean protein in its natural unaltered condition and which has had the characteristic unpleasant flavor and color-producing bodies oxidized, and combined with sodium bicarbonate, said composition being rich in said protein and capable of use as a substitute for cow milk.

MICHELE BONOTTO.